April 25, 1933.

J. M. DUFFY

Re. 18,803

FURNACE APPLIANCE

Original Filed Feb. 6, 1931

INVENTOR
John M. Duffy
BY
Frank L. Owen
ATTORNEY

Reissued Apr. 25, 1933

Re. 18,803

UNITED STATES PATENT OFFICE

JOHN M. DUFFY, OF VENTNOR, NEW JERSEY

FURNACE APPLIANCE

Original No. 1,822,517, dated September 8, 1931, Serial No. 513,839, filed February 6, 1931. Application for reissue filed January 24, 1933. Serial No. 653,276.

The invention in general relates to coal burning furnaces having for its main object the provision of an improved combustion promoting and fuel saving device which may be conveniently secured to conventional forms of coal-burning furnaces without change in the construction thereof.

Another object is to provide a highly efficient coal saving device of comparatively simple design and construction that may be quickly attached to and detached from any ordinary types of coal-burning furnaces.

Other objects and advantages residing in the construction, combination and arrangement of parts will appear hereinafter and will be best understood when taken in connection with the accompanying drawing, in which Figure 1 is an elevational view, partly in section, with parts broken away, of a coal-burning furnace in which an embodiment of my invention has been operatively attached.

Figure 3:
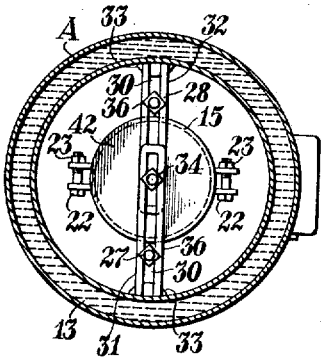
Figure 3 is a transverse sectional view taken on line 3—3 of Figure 1.

In the drawing, wherein similar characters of reference indicate corresponding parts in the preferred form of the invention, A designates a coal burning furnace of conventional type comprising the usual fire box 11 in which is arranged the grate 12. A water jacket 13 of customary type forming a part of the furnace A is adapted to receive the heat from the fuel 14, in this instance coal. The above described construction forms no part of my invention being typical of coal burning furnaces in general.

Figure 4:
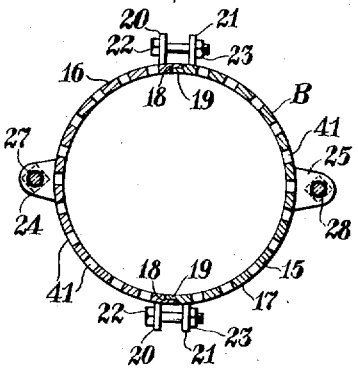
Figure 4 is a transverse sectional view taken on line 4—4 of Figure 2.

My combustion promoting and fuel-saving invention comprises a device B which includes a cylindrical member 15 formed of two semi-cylindrical sections 16—17. As best shown in Figure 4, the lateral edges of the semi-cylindrical sections 16—17 have projections 18—19 which coact to form a comparatively secure interlocking engagement of the said sections 16—17.

Figure 1:
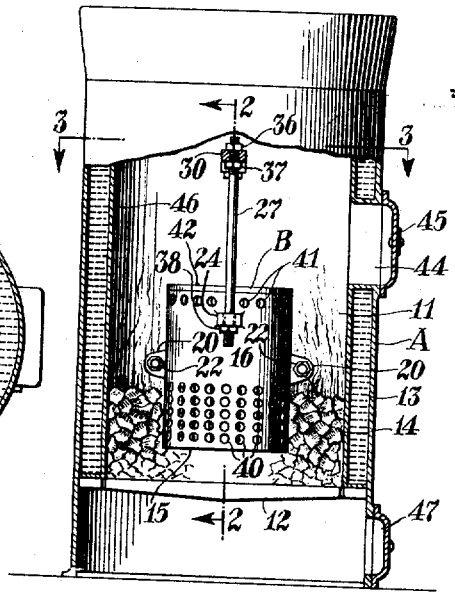
Figure 5:
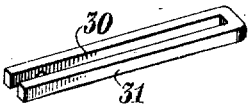
Figure 5 is a perspective view of one of the elements employed for supporting my device in the firebox of a furnace.

By further inspection of Figure 4, and as also shown in Figure 1, each of the semi-cylindrical sections 16—17 are provided with laterally projecting lugs 20—21, these lugs being apertured to receive the stems of bolts 22, the ends of each of which are engaged by a nut 23, which serves with the bolts 22 to clampingly engage the two semi-cylindrical sections 16—17 together to form the completed cylindrical member 15.

Figure 2:
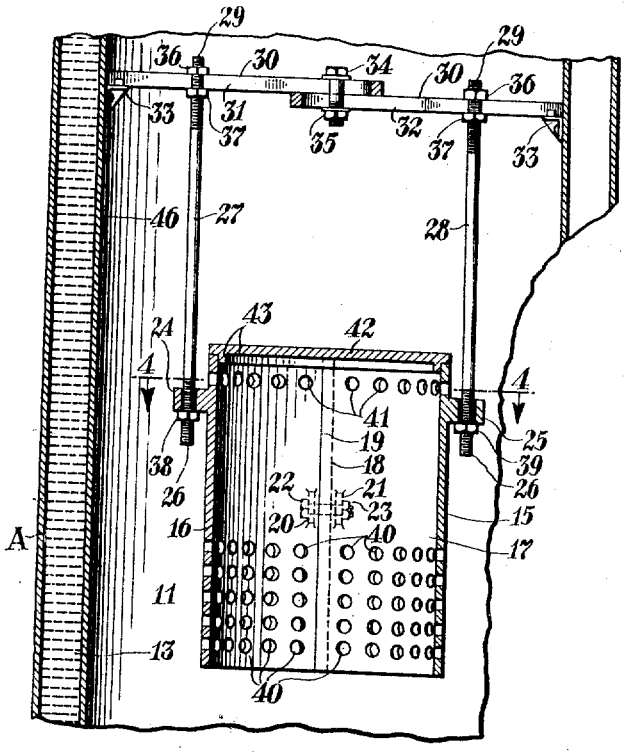
Figure 2 is an enlarged vertical sectional view taken on line 2—2 of Figure 1.

As shown in Figures 1, 2 and 3, it will be seen that the cylindrical member 15 is also provided with projecting lugs 24—25 which are secured to the annular wall of the cylindrical member 15. Each of the laterally projecting lugs 24—25 is apertured to receive the lower threaded ends 26 of bars 27, 28, the upper threaded ends 29 of which pass through slots 30 formed in a coacting pair of elongated U-shaped members 31, 32, the open ends of which are supported on angle iron brackets 33 fastened to the inner wall of the furnace A, as best shown in Figure 3. The U-shaped members 31, 32 are preferably secured together by a bolt 34, the stem of which is passed through the registering slots 30 of the said U-shaped members, a nut 35 clamping same together, as shown in Figure 2.

As illustrated in Figures 2 and 3, the threaded upper ends 29 of the bars 27, 28 are secured in desired position to the U-shaped members 31, 32 by nuts 36, 37 between each pair of which a portion of the said U-shaped members 31—32 is clamped. When the lower nuts 37 are loosened by unscrewing same, the bars 27, 28 may be slid in order to place the member 15 in a predetermined position. It will also be observed that the member 15 may be raised and lowered in the firebox by turning nuts 38, 39 which engage the lugs 24, 25, on the lower threaded ends 26 of the bars 27, 28 respectively.

The cylindrical member 15 is preferably formed with a plurality of holes 40 formed in both semi-cylindrical sections 16—17 towards the lower portion thereof, and it will be further noted that I have also placed a row of perforations 41 in each of said semi-cylindrical sections at the upper part thereof for a purpose which will now appear. Upon the top of the cylindrical member 15, a lid 42 having an internal downwardly projecting annular lip 43 is positioned, the lip 43 engaging the inner periphery of the cylindrical member 15.

The fuel 14 it will be noticed when thrown in the firebox 11 through the opening 44 in the furnace A which is closed by the furnace door 45, will drop into the annular space in the firebox 11 between the inner wall 46 of the water jacket 13, and the exterior surface of the cylindrical member 15.

The cylindrical member 15 may be of such a height that the lid 42 thereof which closes the said cylindrical member at the top, will fall slightly below the level of the opening 44 of the furnace A in order not to interfere with the delivery of the coal to the fire box 11.

The functions and general manner of operation of my device may now be briefly described as follows:

Assuming coal 14 to be burning in the fire box 11, as indicated in Figure 1, and that air is entering through the damper opening 47 at the base of the heater A, a certain part of the air will pass through the coal 14 in the customary manner, while another part of the air will pass up through the unclosed lower end of the cylindrical member 15. Part of this latter air will pass outwardly through the perforations 40 into the coal thereby promoting combustion of the coal, and still another portion will pass upwardly and outwardly through the perforations 41 at the top of the cylindrical member 15, where it will mingle with unconsumed or insufficiently oxygenated gases arising from the burning coal, in this manner providing sufficient oxygen for the said unconsumed gases to permit of their combustion within the fire box 11.

In order that air may flow in the paths above described, it is necessary that the total area of the openings 41 should be less, and preferably many times less than the total area of the openings 40, as shown in the drawing, because otherwise the draft of air in the cylindrical member 15 would shunt across the latter openings and escape through the former openings, thus supplying little, if any, air to support combustion in the fire-bed in the way intended and described. Similarly, the openings 40 should be located as near the top of the fuel bed as possible, as shown in the drawing, so that the path from the cylindrical member 15 into and up through the fuel bed will be of less resistance than the paths through the openings 41, thereby causing the air to flow outwardly into the fuel bed in the way intended and described, instead of in the reverse direction as would be the case if the easier path led through the openings 41.

It is a well known fact that most coal burning furnaces of conventional design and construction permit a portion of unconsumed gases to pass out through the chimney, whereas by the present method, this defect which is not only wasteful of fuel, is prevented.

It is further desired to point out that the central space occupied by the draft reinforcing cylindrical member 15 is that space in the furnace where the heat from the burning fuel or coal is least available for application to the water jacket 13. It can be recognized at a glance that the burning coals immediately juxtaposed against the water jacket 13 are the ones in a large measure responsible for the heating of water within the water jacket 13. A considerable portion of the heat arising from the burning coal in the center of the conventional furnace, particularly the larger types, passes out of the chimney, while in the present case by means of my invention this above mentioned comparatively dead or lost central space is occupied by a device which greatly assists in a more thorough combustion of the coal, while at the same time a much smaller quantity of fuel is required for yielding practically the same results as that hitherto obtained by a much more lavish expenditure of fuel.

As the member 15 may be shifted to the left or right in the firebox 11 by loosening nuts 37, or removed bodily therefrom by removing nuts 38, 39, it will now be seen that the device is adapted to be installed and adjusted quickly in practically all furnaces, and taken out in a few moments when desired.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. A device of the kind described for a coal burning furnace comprising a member having a plurality of draft-promoting holes formed therein, means for supporting said member within the firebox of a coacting furnace, said means including U-shaped members secured within the interior of the furnace and a pair of bars attached to said member fastened to and horizontally adjustable relatively to said U-shaped members.

2. A furnace of the kind described having a fire box, a grate, a combustion chamber, a water jacket, U-shaped members secured within said fire box, and a coacting member, said coacting member being formed of two half sections each provided with a lug, bars securable and vertically adjustable relatively to said lugs and to said U-shaped members, said bars serving to support the coacting member above the grate of the furnace in a plurality of predetermined positions in the firebox thereof, means formed at the upper and lower portion of said member for promoting combustion and oxygenating unconsumed gases, the slots in said U-shaped members receiving said bars whereby the bars may be slid horizontally for arranging said member in predetermined positions.

3. A device of the kind described for use in a furnace having a firebox, said device comprising a hollow apertured member, and a vertically and horizontally adjustable supporting framework attached thereto, whereby said hollow member may be adjusted both vertically and horizontally.

4. A device of the kind described for use in a furnace having a fire box, said device comprising a hollow apertured member, a horizontally adjustable supporting framework attached thereto, whereby said hollow member may be adjusted horizontally, and means for securing said hollow member in its position of horizontal adjustment.

JOHN M. DUFFY.